(12) United States Patent
Adrian et al.

(10) Patent No.: US 12,718,402 B2
(45) Date of Patent: Aug. 25, 2026

(54) DEVICE AND METHOD FOR TRAINING A MACHINE LEARNING MODEL FOR GENERATING DESCRIPTOR IMAGES FOR IMAGES OF OBJECTS

(71) Applicant: Robert Bosch GmbH, Stuttgart (DE)

(72) Inventors: David Adrian, Stuttgart (DE); Andras Gabor Kupcsik, Boeblingen (DE); Markus Spies, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 635 days.

(21) Appl. No.: 18/053,239

(22) Filed: Nov. 7, 2022

(65) Prior Publication Data

US 2023/0150142 A1 May 18, 2023

(30) Foreign Application Priority Data

Nov. 16, 2021 (DE) ..................... 10 2021 212 859.9

(51) Int. Cl.
*B25J 9/16* (2006.01)
*B25J 13/08* (2006.01)
*G06T 7/73* (2017.01)

(52) U.S. Cl.
CPC ............ *B25J 9/1697* (2013.01); *B25J 9/163* (2013.01); *B25J 13/08* (2013.01); *G06T 7/74* (2017.01);

(Continued)

(58) Field of Classification Search
CPC ....... G06V 10/757; G06V 10/77–7715; G06V 10/774; G06V 10/82; G06T 7/70–77;

(Continued)

(56) References Cited

U.S. PATENT DOCUMENTS

2021/0056361 A1* 2/2021 Xiu ...................... G06V 20/695
2022/0172330 A1* 6/2022 Mason ...................... G06T 5/73
2022/0230410 A1* 7/2022 Taheri ...................... G06T 7/55

OTHER PUBLICATIONS

Florence, Peter R., Lucas Manuelli, and Russ Tedrake. "Dense object nets: Learning dense visual object descriptors by and for robotic manipulation." arXiv preprint arXiv:1806.08756 (2018). (Year: 2018).*

(Continued)

*Primary Examiner* — Gregory A Morse
*Assistant Examiner* — Stefano Anthony Dardano
(74) *Attorney, Agent, or Firm* — NORTON ROSE FULBRIGHT US LLP

(57) ABSTRACT

A method for training a machine learning model for generating descriptor images for images of one or of multiple objects. The method includes: formation of pairs of images which show the one or the multiple objects from different perspectives; generation, for each image pair, using the machine learning model, of a first descriptor image for the first image, and of a second descriptor image for the second image, which assigns descriptors to points of the one or multiple objects shown in the second image; sampling, for each image pair, of descriptor pairs, which include in each case a first descriptor from the first descriptor image and a second descriptor from the second descriptor image, which are assigned to the same point, and the adaptation of the machine learning method for reducing a loss.

8 Claims, 3 Drawing Sheets

(52) U.S. Cl.
CPC .............. *G05B 2219/39001* (2013.01); *G05B 2219/40528* (2013.01); *G06T 2207/20081* (2013.01); *G06T 2207/20084* (2013.01)

(58) Field of Classification Search
CPC ............. G06T 7/50; G06T 2207/20081; G06T 2207/20084; G06F 18/213; G06F 18/28; G06F 18/24–2413; G06F 18/214; G06N 3/02–105; G05B 2219/37555; G05B 2219/39001; G05B 2219/39543; G05B 2219/40528; G05B 2219/39017; G05B 2219/40557; G05B 2219/45063; B25J 13/08; B25J 19/023; B25J 9/163; B25J 9/1697
See application file for complete search history.

(56) References Cited

OTHER PUBLICATIONS

Chen, Ting, et al. "A simple framework for contrastive learning of visual representations." International conference on machine learning. PMLR, 2020. (Year: 2020).*

Vecerik, Mel, et al. "S3k: Self-supervised semantic keypoints for robotic manipulation via multi-view consistency." Conference on Robot Learning. PMLR, 2021. (Year: 2021).*

Yang, Shuo, et al. "Learning multi-object dense descriptor for autonomous goal-conditioned grasping." IEEE Robotics and Automation Letters 6.2 (2021): 4109-4116. (Year: 2021).*

Sundaresan, Priya, et al. "Learning rope manipulation policies using dense object descriptors trained on synthetic depth data." 2020 IEEE International Conference on Robotics and Automation (ICRA). IEEE, 2020. (Year: 2020).*

Hadjivelichkov, Denis, and Dimitrios Kanoulas. "Fully self-supervised class awareness in dense object descriptors." arXiv preprint arXiv:2110.01957 (2021). (Year: 2021).*

Prabhudesai, Mihir, et al. "3d object recognition by corresponding and quantizing neural 3d scene representations." arXiv preprint arXiv:2010.16279 (2020). (Year: 2020).*

Rhodin, Helge, et al. "Learning monocular 3d human pose estimation from multi-view images." Proceedings of the IEEE conference on computer vision and pattern recognition. 2018. (Year: 2018).*

Florence et al., "Dense Object Nets: Learning Dense Visual Object Descriptors By and For Robotic Manipulation." ARXIV (2018) pp. 1-12.

Schmidt et al., "Self Supervised Visual Descriptor Learning for Dense Correspondence." IEEE International Conference on Robotics and Automation (ICRA) (2017) pp. 1-8.

Trotter., "How to Train Your Siamese Neural Network." Towards Data Science (2021) pp. 1-35.

Weng.,"Constrastive Representation Learning." Lil'Log (2021) pp. 1-26.

Chen et al., "A Simple Framework for Contrastive Learning of Visual Representations." ARXIV (2020) pp. 1-20.

* cited by examiner 100
104
109
103
114
108
101
102
107
105
113
113
113
112
111
106
110
(robot) control unit
memory
machine learning model
processor(s)

DEVICE AND METHOD FOR TRAINING A MACHINE LEARNING MODEL FOR GENERATING DESCRIPTOR IMAGES FOR IMAGES OF OBJECTS

FIELD

The present invention relates to devices and to methods for training a machine learning model for generating descriptor images for images of objects.

SUMMARY

In order to enable a flexible manufacturing or processing of objects by a robot, it is desirable that the robot is able to handle an object regardless of the position in which the object is placed in the workspace of the robot. Thus, the robot should be capable of recognizing which parts of the object are located at which positions so that it is able, for example, to grip the object at the correct point in order, for example, to attach it to another object, or to weld the object at the present spot. This means that the robot should be capable of recognizing the pose (position and orientation) of the object, for example, from one or from multiple images, which are recorded by a camera fastened on the robot, or of ascertaining the position of points for picking up or processing. One approach for achieving the above consists in determining descriptors, i.e., points (vectors) in a predefined descriptor space, for parts of the object (i.e., pixels of the object represented in an image plane), the robot being trained to assign the same descriptors to the same parts of an object regardless of an instantaneous pose of the object, and thus to recognize the topology of the object in the image, so that it is then known, for example, where which corner of the object is located in the image.

Knowing the pose of the camera, it is then possible in turn to draw conclusions about the pose of the object. The recognition of the topology may be implemented using a machine learning model, which is trained accordingly.

One example thereof is the dense object net described in the publication "Dense Object Nets Learning Dense Visual Object Descriptors By and For Robotic Manipulation" by Peter Florence et al. (referred to hereinafter as "Reference 1"). The dense object net in this case is trained in a self-supervising manner, the focus being on isolated objects.

In practice, however, objects often occur together, for example, in the task of removing one object from a box full of objects.

Methods for training machine learning models for generating descriptor images such as, for example, a dense object net, are therefore desirable, which produce positive results even in such practice-relevant scenarios.

According to various specific embodiments of the present invention, a method for training a machine learning model for generating descriptor images for images of one or of multiple objects is provided, which includes the formation of pairs of images, each image pair including a first image and a second image, which show the one or the multiple objects from different perspectives, the generation, for each image pair, with the aid of the machine learning model, of a first descriptor image for the first image, which assigns descriptors to points of the one or multiple objects shown in the first image, and of a second descriptor image for the second image, which assigns descriptors to points of the one or multiple objects shown in the second image, the sampling, for each image pair, of descriptor pairs, which include in each case a first descriptor from the first descriptor image and a second descriptor from the second descriptor image, which are assigned to the same point, and the adaptation of the machine learning model for reducing a loss, which includes for each sampled descriptor pair the ratio of the distance according to a distance measure between the first descriptor and the second descriptor to the sum of all distances according to the distance measure between the first descriptor and the descriptors of the second descriptor image, which appear in the sampled descriptor pairs.

The above-described method enables a better training of machine learning models, which generate descriptor images, in particular, of dense object nets. A machine learning model trained with the above-described method is, in particular, better able to handle images with scenes that contain multiple objects. The use of images containing multiple (identical) objects facilitates in turn the collection of training data and the data efficiency, since in one image alone the objects are shown at different viewing angles. In addition, no objects masks are required.

The method allows for the training of the machine learning model with the aid of self-supervised learning, i.e., without the marking (labeling) of data. It may thus be automatically trained for new objects and accordingly used by robots in a simple manner, for example, in industrial settings, for processing new objects.

Various exemplary embodiments of the present invention are specified below.

Exemplary embodiment 1 is a method for training a machine learning model for generating descriptor images for images of one or of multiple objects, as described above.

Exemplary embodiment 1 further includes: recording of the one or multiple images in camera images, obtaining additional images by augmenting at least a portion of the camera images, and forming the pairs of images from the camera images and additional images, the augmentation including one or multiple of: resizing and cropping, perspective and affine distortion, horizontal and vertical mirroring, rotation, addition of blurring, addition of color noise and conversion to gray scales.

Supplementing training images with the aid of augmentation reduces the risk of over-adaptation during training and increases the robustness of the training due to the enlargement of the training data set.

Exemplary embodiment 2 is the method according to exemplary embodiment 1, at least one additional image being generated from the camera images for each of resizing and cropping, perspective and affine distortion, horizontal and vertical mirroring, rotation, addition of blurring, addition of color noise and conversion to grayscale.

A broad spectrum of augmentations enables a robust training, in particular, in the event that multiple objects are shown in the images used for the training.

Exemplary embodiment 3 is the method according to one of exemplary embodiments 1 through 2, including recording camera images, which show multiple of the objects in each case; and forming the pairs of images at least partially from the camera images.

This ensures, among other things, that a large portion of the images shows objects and thus contains pieces of information of interest for the training. The need to generate object masks may also be avoided.

Exemplary embodiment 4 is the method according to one of exemplary embodiments 1 through 3, the machine learning model being a neural network.

In other words, a dense object net is trained. With this, it is possible to achieve positive results for generating descriptor images.

Exemplary embodiment 5 is the method for controlling a robot for picking up or processing an object, including training a machine learning model according to one of exemplary embodiments 1 through 4, recording a camera image, which shows the object in an instantaneous control scenario, feeding the camera image to the machine learning model for generating a descriptor image, ascertaining the position of a point for picking up or processing the object in the instantaneous control scenario from the descriptor image and controlling the robot according to the ascertained position.

Exemplary embodiment 6 is the method according to exemplary embodiment 5, including identifying a reference point in a reference image, ascertaining a descriptor of the identified reference point by feeding the reference image to the machine learning model, ascertaining the position of the reference point in the instantaneous control scenario by finding the ascertained descriptor in the descriptor image generated from the camera image, and ascertaining the position of the point for picking up or processing the object in the instantaneous control scenario from the ascertained position of the reference point.

Exemplary embodiment 7 is a control unit which is configured to carry out a method according to one of exemplary embodiments 1 through 6.

Exemplary embodiment 8 is a computer program including commands which, when they are executed by a processor, prompt the processor to carry out a method according to one of exemplary embodiments 1 through 6.

Exemplary embodiment 9 is a computer-readable memory medium, which stores commands which, when they are executed by a processor, prompt the processor to carry out a method according to one of exemplary embodiments 1 through 6.

BRIEF DESCRIPTION OF THE DRAWINGS

In the figures, similar reference numerals refer in general to the same parts in all the various views. The figures are not necessarily true to scale, the emphasis instead being placed in general on the representation of the principles of the present invention. In the following description, various aspects are described with reference to the figures.

DETAILED DESCRIPTION OF EXAMPLE EMBODIMENTS

The following detailed description refers to the figures which, for the purpose of explanation, show specific details and aspects of this description, in which the present invention may be carried out. Other aspects may be used and structural, logical and electrical changes may be carried out without departing from the scope of protection of the present invention. The various aspects of this description are not necessarily mutually exclusive, since some aspects of this description may be combined with one or multiple other aspects of this description in order to form new aspects.

Various examples are described in greater detail below.

Figure 1:
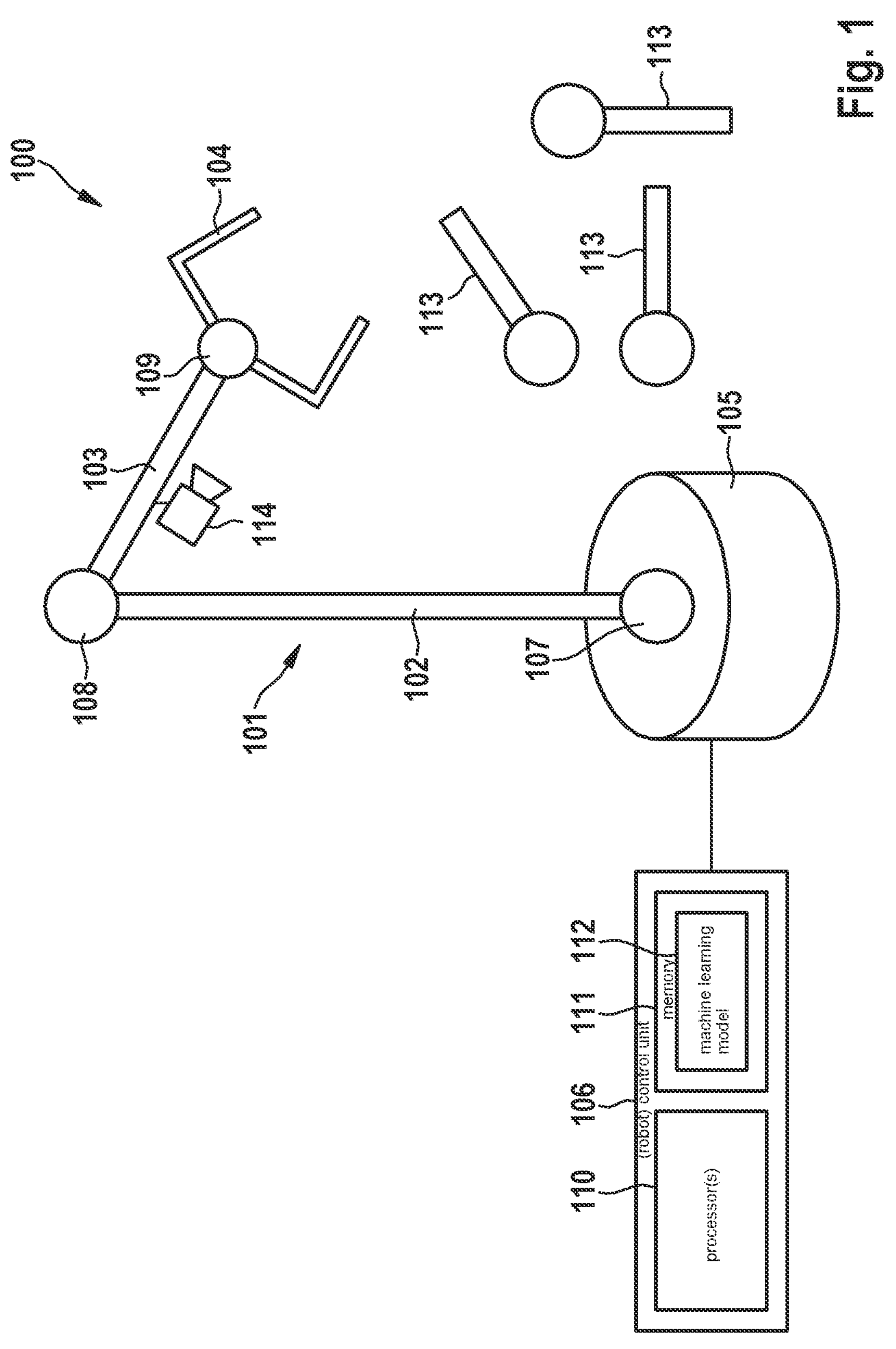
FIG. 1 shows a robot according to an example embodiment of the present invention.

FIG. 1 shows a robot 100.

Robot 100 includes a robotic arm 101, for example, an industrial robotic arm for handling or mounting a workpiece (or one or multiple other objects). Robotic arm 101 includes manipulators 102, 103, 104 and a base (or support) 105, with the aid of which manipulators 102, 103, 104 are supported. The term "manipulator" refers to the movable elements of robotic arm 101, the actuation of which enables a physical interaction with the surroundings, for example, in order to carry out a task. For the control, robot 100 includes a (robot) control unit 106, which is configured for the purpose of implementing the interaction with the surroundings according to a control program. Last element 104 (which is furthest away from base 105) of manipulators 102, 103, 104 is also referred to as end effector 104 and may include one or multiple tools such as, for example, a welding torch, a gripping instrument, a painting device, or the like.

Other manipulators 102, 103 (closer to base 105) may form a positioning device so that, together with end effector 104, robotic arm 101 is provided with end effector 104 at its end. Robotic arm 101 is a mechanical arm (possibly with a tool at its end), which is able to fulfill functions similar to a human arm.

Robotic arm 101 may include joint elements 107, 108, 109, which connect manipulators 102, 103, 104 to one another and to base 105. A joint element 107, 108, 109 may have one or multiple joints, each of which is able to provide a rotational movement (i.e., a rotation) and/or a translational movement (i.e., displacement) for associated manipulators relative to one another. The movement of manipulators 102, 103, 104 may be initiated with the aid of actuators, which are controlled by control unit 106.

The term "actuator" may be understood to mean a component, which is designed to influence a mechanism or process in response to its drive. Due to instructions generated by control unit 106, the actuator is able to implement mechanical movements (the so-called activation). The actuator, for example, an electromechanical converter, may be designed to convert electrical energy into mechanical energy in response to its activation.

The term "control unit" may be understood to mean any type of logic-implementing entity, which may include, for example, a circuit and/or a processor, which is/are able to execute a software, which is stored in a memory medium, firmware or a combination thereof, and is able, for example, to output the commands, for example, to an actuator in the present example. The control unit may, for example, be configured by program code (for example, software) in order to control the operation of a system, in the present example, of a robot.

In the present example, control unit 106 includes one or multiple processors 110 and a memory 111, which stores code and data, on the basis of which processor 110 controls robotic arm 101. According to various specific embodiments, control unit 106 controls robotic arm 101 on the basis of a machine learning model 112, which is stored in memory 111.

Control unit 106 uses the machine learning model 112 in order to ascertain the pose of an object 113, which is placed, for example, in a workspace of the robotic arm. Control unit 106 is able to decide as a function of the ascertained pose which point of objects 113 is to be gripped (or otherwise processed) by end effector 109.

Control unit 106 ascertains the pose using the machine learning model 112 using one or multiple camera images of object 113. Robot 100 may be equipped, for example, with one or with multiple cameras 114, which enable it to record images of its workspace. Camera 114 is fastened for example, at robotic arm 101, so that the robot is able to record images of object 113 from various perspectives by moving robotic arm 101 around. One or multiple fixed cameras may, however, also be provided.

Machine learning model 112 according to various specific embodiments is a (deep) neural network, which generates a feature map for a camera image, for example, in the form of an image in a feature space, which makes it possible to assign points in the (2D) camera image to points of the (3D) object.

For example, machine learning model 112 may be trained to assign a particular corner of the object a particular (unique) feature value (also referred to as descriptor value) in the feature space. If machine learning model 112 is then fed a camera image and machine learning model 112 assigns this feature value to a point of the camera image, it may then be concluded that the corner is located at this point (i.e., at a point in the space, whose projection onto the camera plane corresponds to the point in the camera image). If the position of multiple points of the object in the camera image is thus known, the pose of the object in the space may be ascertained.

Machine learning model 112 must be suitably trained for this task.

One example of a machine learning model 112 for object recognition is a dense object net. A dense object net maps an image (for example, an RGB image $I \in \mathbb{R}^{H \times W \times 3}$) provided by camera 114 onto an arbitrary dimensional (dimension D, for example, D=16) descriptor spatial image (also referred to as descriptor image) $I_D \in \mathbb{R}^{H \times W \times D}$. The dense object net is a neural network, which is trained using self-supervising learning to output a descriptor spatial image for an input image of an image. Thus, images of known objects (or also of unknown objects) may be mapped onto descriptor images, which contain descriptors that identify points on the object regardless of the perspective of the image.

In the self-supervised training described in Reference 1, the focus lies on isolated objects; in practice, however, objects often occur together, for example, in the task of removing one object from a box full of objects.

Exemplary embodiments are described below, which enable an improved training of a dense object net for such practice-relevant scenarios.

In the process, static scenes including multiple objects 113 are recorded with the aid of a camera 114, camera 114 in various specific embodiments being an RGB-D camera attached at robotic arm 101 (for example, at the "wrist" of end effector 114) (i.e. a camera that provides a piece of color information and depth information). For each scene, thousands of such images are recorded from different viewing angles. From recorded images for each scene, one image pair $I^A$, $I^B$ each is then sampled for the training. Each image pair contains two images, which show the respective scene from different perspectives.

According to various specific embodiments, one or both of the images are augmented. Augmentations enable the learning of different global feature representations. Augmentations make it possible to diversify the training data (made up of the recorded images of various scenes), to increase the data efficiency and to reduce over-adaptations. Augmentations used according to various specific embodiments are:

- resizing and cropping
- perspective and affine distortion
- horizontal and vertical mirroring
- rotations
- blurring
- color noise
- conversion to grayscale In practice, transformations such as perspective distortions, in particular, occur in scenarios in which a robot manipulates an object. Similarly, blurring and color distortions occur often in practice due to changing light conditions or motion blurring.

Thus, by expanding the training data with the aid of augmentations of image pairs (in each case one of the images), it is not only possible to reduce over-adaptations, which may occur as a result of an excessively small amount of training data, but it also provides additional test data elements (image pairs) for improving the robustness of the training.

Figure 2:
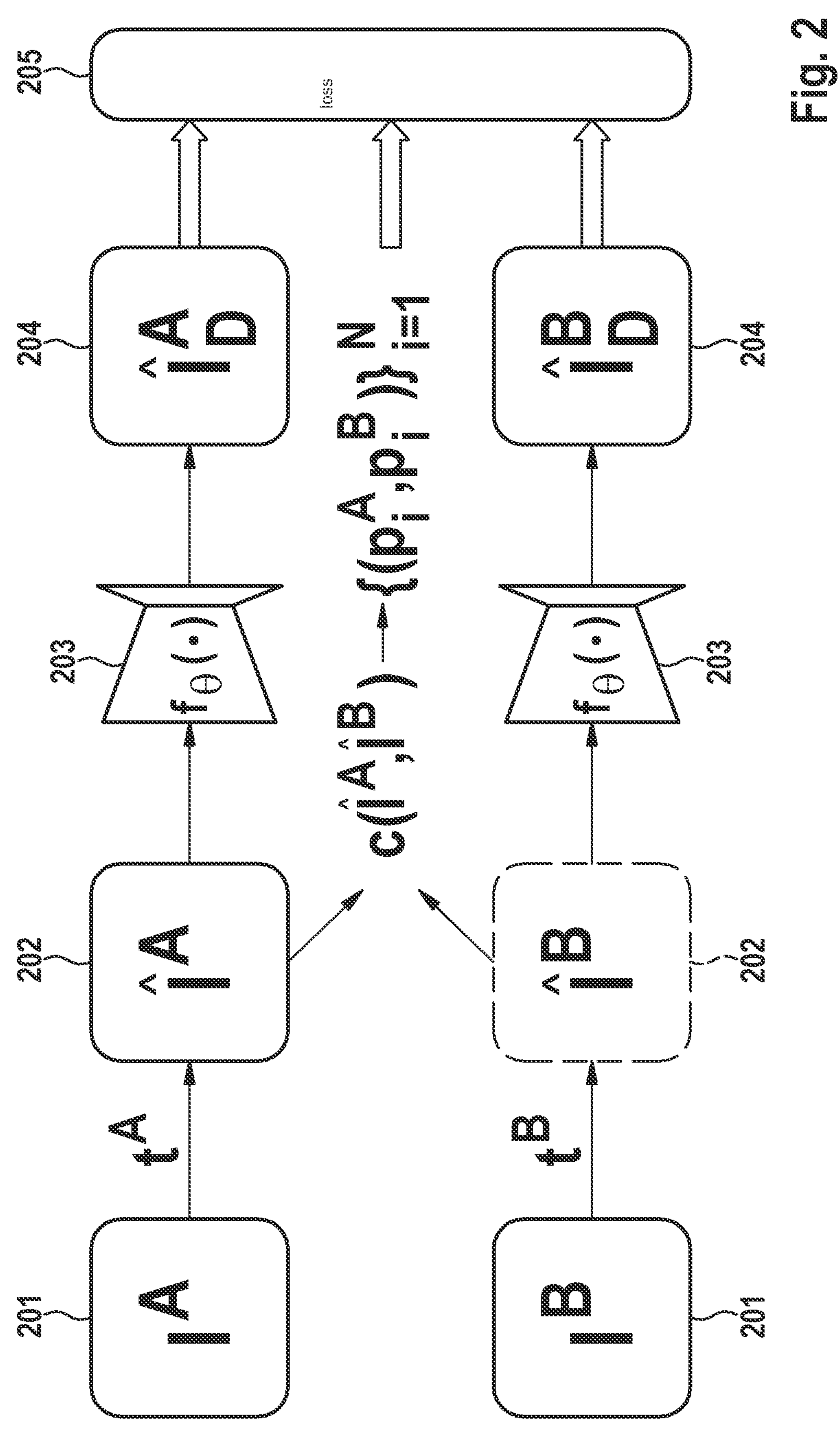
FIG. 2 shows a training of a dense object net using an augmentation according to one specific example embodiment of the present invention.

FIG. 2 shows a training of a DON using an augmentation.

For an image pair 201 $I^A$, $I^B$, a respective augmentation $t^A$, $t^B$ is randomly selected for one or for each of the two images, and applied to the image. The result is a new image pair 202, which is used as a DON training image pair, in which one or both images have emerged as a result of augmentation. The two images of DON training image pair 202 are then mapped onto a pair of descriptor images 204 by the (same) DON 203, represented by function $f_\theta$ implemented by it.

For the pair of descriptor images 204, a loss 205 is then calculated, according to which DON 203 is trained i.e., the parameters (weights) of DON θ are adapted in such a way that loss 205 is reduced. The loss in this case is calculated, for example, for batches of input images 201.

The calculation of the loss uses a correspondence sampling process, identified by c(.,.), which provides correspondences between pixels of the images of the DON training image pair. These correspondences are used for the calculation of the loss (see below).

Correspondence sampling may be very easily carried out for a DON training image pair 202 if camera parameters and depth information are present for the respective camera pose (i.e., the perspective in which the respective image has been recorded). Since, however, according to various specific embodiments, the pose ascertainment is applied in scenes in which numerous objects 113 are present tightly packed in the workspace of robot 100, concealments and, in part, overlapping viewing angles occur. Therefore, according to various specific embodiments, instead of directly sampling individual pixels and subsequently checking their validity, the following direct approach is used. Each pixel of the first image is mapped into the perspective of the second image (using its position in the world coordinate system) and it is then ascertained which pixels are visible (i.e., not concealed) in the perspective of the second image. This provides a Boolean mask for the first image, which indicates which pixels in the first image have a corresponding pixel in the second image. Randomly corresponding pixels may now be sampled (sampling process c(.,.)), the previously ascertained mapping of pixels of the first image being used in the perspective of the second image. A pair of corresponding pixels is also referred to as pixels belonging to one another or as positive pairs.

Loss 205 according to various specific embodiments is calculated with the aid of a (single) loss function. For this purpose N positive pairs for training image pair 202 are sampled. Each positive pair provides one pair of associated descriptors from descriptor image pair 204, thus, a total of 2N descriptors. For each descriptor, all other 2N−1 descriptors are treated as negative examples. The loss function is selected in such a way that during training, all 2N descriptors are optimized with respect to one another.

For a pair of descriptors $d_i$, $d_j$, a pairwise loss is defined as $$I_{i,j} = -\log\frac{\exp(D(d_i d_j)/\tau}{\sum_{k=1;k\neq i}^{2N}\exp(D(d_i,d_k)/\tau)} \quad (1)$$

τ being a temperature scaling factor (for example, between 0.01 and 0.3) and D(.,.) being a distance measure or similarity measure. Complete loss 205 for a training image pair 202 is then provided by the sum of all pairwise losses according to (1).

For a batch of training image pairs, these losses of the image pairs are summed over the image pairs in order to obtain the complete loss for the batch. For this loss, a gradient is then calculated and machine learning model 112 (for example, the weights of the neural network) is adapted in order to reduce this loss (i.e., adapted toward the decrease of the loss as indicated by the gradient).

The cosine similarity, for example, is used as a similarity measure, defined as $$D(d_i, d_j) = \frac{\langle d_i, d_j\rangle}{\|d_i\|2\|d_j\|2} \quad (2)$$

This is the scalar product between vectors, which have been standardized to length one.

Figure 3:
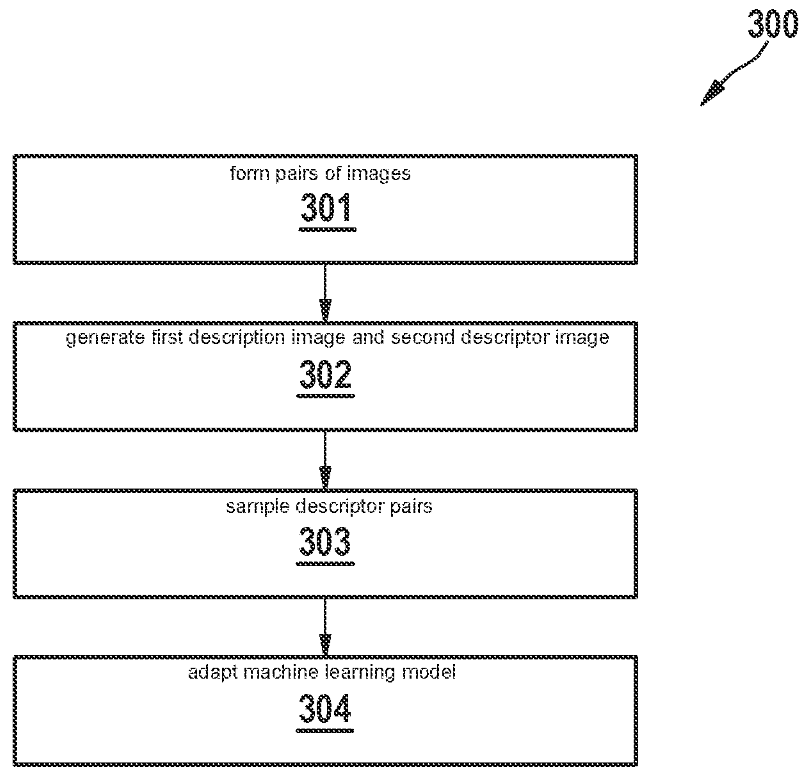
FIG. 3 shows a flowchart for a method for training a machine learning model for generating descriptor images for images of objects according to one specific example embodiment of the present invention.

In summary, according to various specific embodiments, a method is provided as represented in FIG. 3.

FIG. 3 shows a flowchart 300 for a method for training a machine learning model for generating descriptor images for images of objects according to one specific embodiment.

In 301, pairs of images are formed, each image pair including a first image and a second image, which show the one or the multiple objects from different perspectives.

In 302, a first descriptor image for the first image, which assigns descriptors to points of the one or of the multiple objects shown in the first image and a second descriptor image for the second image, which assigns descriptors to points of the one or of the multiple objects shown in the second image, are generated for each image pair with the aid of the machine learning model. This takes place by feeding the first image or the second image to the machine learning model.

In 303, descriptor pairs are sampled for each image pair, which include in each case a first descriptor from the first descriptor image and a second descriptor from the second descriptor image, which are assigned to the same point.

In 304, the machine learning model is adapted for reducing a loss, which includes for each sampled descriptor pair the ratio of the distance according to a distance measure between the first descriptor and the second descriptor to the sum of all distances according to the distance measure between the first descriptor and the descriptors of the second descriptor image, which occur in the sample descriptor pairs. In the process, a gradient is formed, the variables being parameters of the machine learning model (for example, weights) and the parameters of the machine learning model being adapted toward the decreasing loss.

With the aid of the trained machine learning model, it is ultimately possible (for example, by using the trained machine learning model for ascertaining an object pose or by ascertaining points to be processed) to generate a control signal for a robotic device. The term "robotic device" may be understood as relating to any physical system such as, for example, a computer-controlled machine, a vehicle, a household appliance, a power tool, a manufacturing machine, a personal assistant or an access control system. A control specification for the physical system is learned and the physical system is then controlled accordingly.

For example, images are recorded with the aid of an RGB-D (color image plus depth) camera, processed by the trained machine learning model (for example, a neural network), and relevant points in the work area of the robotic device are ascertained, the robotic device being controlled as a function of the ascertained points.

The camera images are, for example, RGB images or RGB-D (color image plus depth) images, but may also be other types of camera images such as (only) deep images or thermal images. The output of the trained machine learning model may be used to ascertain object poses, for example, for controlling a robot, for example, for assembling a larger object from sub-objects, the movement of objects, etc. The approach of FIG. 3 may be used for any pose ascertainment method.

The method according to one specific embodiment is computer implemented.

Although specific embodiments have been represented and described here, it is recognized by those skilled in the art in this field that the specific embodiments shown and described may be exchanged for a variety of alternative and/or equivalent implementations without departing from the scope of protection of the present invention. This application is intended to cover any adaptations or variations of the specific exemplary embodiments, which are disclosed herein.

What is claimed is:

1. A method for training a machine learning model for generating descriptor images for images of one or of multiple objects, comprising the following steps:

forming pairs of images, each image pair of the pairs of images including a first image and a second image, which show the one or the multiple objects from different perspectives;

generating, for each image pair, using the machine learning model, a first descriptor image for the first image of the image pair, which assigns descriptors to points of the one or multiple objects shown in the first image of the image pair, and a second descriptor image for the second image of the image pair, which assigns descriptors to points of the one or multiple objects shown in the second image of the image pair;

sampling, for each image pair, descriptor pairs, which each include a first descriptor from the first descriptor image and a second descriptor from the second descriptor image, which are assigned to the same point;

adapting the machine learning method for reducing a loss, which includes for each sampled descriptor pair the ratio of the distance according to a distance measure between the first descriptor and the second descriptor to the sum of all distances according to the distance measure between the first descriptor and the descriptors of the second descriptor image, which appear in the sampled descriptor pairs;

wherein the method is performed without object masks and further comprises the following steps:

recording the one or multiple objects in camera images;

obtaining additional images by augmenting at least a portion of the camera images, and forming the pair of images from the camera images and additional images, each of the pairs of images including a camera image and a camera image obtained by augmentation, the augmentation including one or multiple of: resizing and cropping, perspective and affine distortion, horizontal and vertical mirroring, rotation, addition of blurring, addition of color noise and conversion to grayscale.

2. The method as recited in claim 1, wherein at least one additional image is generated from the camera images for each of resizing and cropping, perspective and affine distortion, horizontal and vertical mirroring, rotation, addition of blurring, addition of color noise, and conversion to grayscale.

3. The method as recited in claim 1, further comprising:
recording camera images which each include multiple of the objects; and
forming the pairs of images at least partially from the camera images.

4. The method as recited in claim 1, wherein the machine learning model is a neural network.

5. A method for controlling a robot for picking up or processing an object, comprising:
training a machine learning model including:
forming pairs of images, each image pair of the pairs of images including a first image and a second image, which show the one or the multiple objects from different perspectives;
generating, for each image pair, using the machine learning model, a first descriptor image for the first image of the image pair, which assigns descriptors to points of the one or multiple objects shown in the first image of the image pair, and a second descriptor image for the second image of the image pair, which assigns descriptors to points of the one or multiple objects shown in the second image of the image pair;
sampling, for each image pair, descriptor pairs, which each include a first descriptor from the first descriptor image and a second descriptor from the second descriptor image, which are assigned to the same point;
adapting the machine learning method for reducing a loss, which includes for each sampled descriptor pair the ratio of the distance according to a distance measure between the first descriptor and the second descriptor to the sum of all distances according to the distance measure between the first descriptor and the descriptors of the second descriptor image, which appear in the sampled descriptor pairs;
wherein the method is performed without object masks and further comprises the following steps:
recording the one or multiple objects in camera images;
obtaining additional images by augmenting at least a portion of the camera images, and forming the pair of images from the camera images and additional images, each of the pairs of images including a camera image and a camera image obtained by augmentation, the augmentation including one or multiple of: resizing and cropping, perspective and affine distortion, horizontal and vertical mirroring, rotation, addition of blurring, addition of color noise and conversion to grayscale;
recording a camera image which shows the object in an instantaneous control scenario;
feeding the camera image to the machine learning model for generating a descriptor image;
ascertaining the position of a point for picking up or processing the object in the instantaneous control scenario from the descriptor image; and
controlling the robot according to the ascertained position.

6. The method as recited in claim 5, further comprising:
identifying a reference point in a reference image;
ascertaining a descriptor of the identified reference point by feeding the reference image to the machine learning model;
ascertaining the position of the reference point in the instantaneous control scenario by finding the ascertained descriptor in the descriptor image generated from the camera image; and
ascertaining the position of the point for picking up or processing the object in the instantaneous control scenario from the ascertained position of the reference point.

7. A control unit configured to train a machine learning model for generating descriptor images for images of one or of multiple objects, the control unit configured to:
form pairs of images, each image pair of the pairs of images including a first image and a second image, which show the one or the multiple objects from different perspectives;
generate, for each image pair, using the machine learning model, a first descriptor image for the first image of the image pair, which assigns descriptors to points of the one or multiple objects shown in the first image of the image pair, and a second descriptor image for the second image of the image pair, which assigns descriptors to points of the one or multiple objects shown in the second image of the image pair;
sample, for each image pair, descriptor pairs, which each include a first descriptor from the first descriptor image and a second descriptor from the second descriptor image, which are assigned to the same point;
adapt the machine learning method for reducing a loss, which includes for each sampled descriptor pair the ratio of the distance according to a distance measure between the first descriptor and the second descriptor to the sum of all distances according to the distance measure between the first descriptor and the descriptors of the second descriptor image, which appear in the sampled descriptor pairs;
wherein the control unit operates without using object masks and is further configured to:
record the one or multiple objects in camera images;
obtain additional images by augmenting at least a portion of the camera images, and forming the pair of images from the camera images and additional images, each of the pairs of images including a camera image and a camera image obtained by augmentation, the augmentation including one or multiple of: resizing and cropping, perspective and affine distortion, horizontal and vertical mirroring, rotation, addition of blurring, addition of color noise and conversion to grayscale.

8. A non-transitory computer-readable memory medium on which is stored a computer program for training a machine learning model for generating descriptor images for images of one or of multiple objects, the computer program, when executed by a computer, causing the computer to perform the following steps:
forming pairs of images, each image pair of the pairs of images including a first image and a second image, which show the one or the multiple objects from different perspectives;
generating, for each image pair, using the machine learning model, a first descriptor image for the first image of the image pair, which assigns descriptors to points of the one or multiple objects shown in the first image of the image pair, and a second descriptor image for the second image of the image pair, which assigns descriptors to points of the one or multiple objects shown in the second image of the image pair;

sampling, for each image pair, descriptor pairs, which each include a first descriptor from the first descriptor image and a second descriptor from the second descriptor image, which are assigned to the same point;

adapting the machine learning method for reducing a loss, which includes for each sampled descriptor pair the ratio of the distance according to a distance measure between the first descriptor and the second descriptor to the sum of all distances according to the distance measure between the first descriptor and the descriptors of the second descriptor image, which appear in the sampled descriptor pairs;

wherein the computer program, when executed by the computer, further causes the computer to operate without object masks and perform the following steps:

recording the one or multiple objects in camera images;

obtaining additional images by augmenting at least a portion of the camera images, and forming the pair of images from the camera images and additional images, each of the pairs of images including a camera image and a camera image obtained by augmentation, the augmentation including one or multiple of: resizing and cropping, perspective and affine distortion, horizontal and vertical mirroring, rotation, addition of blurring, addition of color noise and conversion to grayscale.

* * * * *